(12) United States Patent
Kim et al.

(10) Patent No.: US 9,333,986 B2
(45) Date of Patent: May 10, 2016

(54) WHEELBASE FOR MOVABLE STRUCTURE

(71) Applicant: POSCO, Pohang-si, Gyeongsangbuk-do (KR)

(72) Inventors: Yong Joo Kim, Seongnam-si (KR); Jin Seok Jung, Seoul (KR); Seung Chul Baik, Seongnam-si (KR)

(73) Assignee: POSCO, Gyeongsangbuk-Do (KR)

( * ) Notice: Subject to any disclaimer, the term of this patent is extended or adjusted under 35 U.S.C. 154(b) by 0 days.

(21) Appl. No.: 14/368,713

(22) PCT Filed: Dec. 21, 2012

(86) PCT No.: PCT/KR2012/011315
§ 371 (c)(1),
(2) Date: Jun. 25, 2014

(87) PCT Pub. No.: WO2013/100503
PCT Pub. Date: Jul. 4, 2013

(65) Prior Publication Data
US 2014/0375022 A1 Dec. 25, 2014

(30) Foreign Application Priority Data

Dec. 26, 2011 (KR) ........................ 10-2011-0142612

(51) Int. Cl.
B62B 3/00 (2006.01)
B62D 21/14 (2006.01)
(Continued)

(52) U.S. Cl.
CPC B62D 21/14 (2013.01); A61G 5/08 (2013.01); A61G 5/042 (2013.01); A61G 5/10 (2013.01); A61G 2005/0833 (2013.01)

(58) Field of Classification Search
CPC ...... B62B 3/02; B62B 3/022; B62B 2205/00; B62B 2205/003; B62B 2205/12; B62B 2205/14; B62B 2205/145; B62B 2301/10; B62B 2206/00; B62B 2206/02; B62B 2206/003; B60Y 2200/84; B62D 21/14; A61G 5/00; A61G 5/02; A61G 5/021; A61G 5/04; A61G 5/08; A61G 2005/0808; A61G 2005/0816; A61G 2005/0833

USPC .......... 180/208, 209, 906, 907; 280/638, 278, 280/287
See application file for complete search history.

(56) References Cited

U.S. PATENT DOCUMENTS 3,455,404 A * 7/1969 Hansen .................. 180/209
3,797,880 A * 3/1974 Pezzaglia ............... 296/26.13
(Continued)

FOREIGN PATENT DOCUMENTS

JP 2001-54255 2/2001
JP 2005-111063 A 4/2005
(Continued)

OTHER PUBLICATIONS

English-language International Search Report from the Korean Patent Office for International Application No. PCT/KR2012/011315, mailing date Apr. 15, 2013.

*Primary Examiner* — James M Dolak
(74) *Attorney, Agent, or Firm* — Finnegan Henderson Farabow Garrett & Dunner LLP

(57) ABSTRACT

The present invention is a wheelbase for a movable structure, comprising: a first frame unit connected to either a front wheels or a rear wheels; a second frame unit connected to the other of the front wheels or the rear wheels and located below or above the first frame and coupled to the first frame (an accommodation space being formed between the first frame unit and the second frame unit); a slider unit located within the accommodation space and coupled to either the first frame unit or the second frame unit; a driving unit located at a longitudinal cross sectional surface of the other of the first frame unit or the second frame unit so as to generate a driving force; and a driving-force-transmitting unit for interconnecting the driving unit and the slider unit to transmit the driving force to the slider unit. The driving unit moves the slider unit along the lengthwise direction of the other of the first frame unit or the second frame unit so as to adjust the spacing between the front wheels and the rear wheels. The thus-configured wheelbase for a movable structure may adjust the spacing between wheels in order to achieve a suitable state of the movable structure.

4 Claims, 3 Drawing Sheets

(51) Int. Cl.
*A61G 5/08* (2006.01)
*A61G 5/04* (2013.01)
*A61G 5/10* (2006.01)

(56) References Cited

U.S. PATENT DOCUMENTS

| | | | |
|---|---|---|---|
| 4,789,181 A | 12/1988 | Baxter | |
| 4,825,971 A * | 5/1989 | Bernstein | 180/65.1 |
| 4,834,409 A * | 5/1989 | Kramer | 180/209 |
| 4,852,898 A * | 8/1989 | Donoghue et al. | 280/216 |
| 4,941,540 A * | 7/1990 | Bernstein | 180/65.1 |
| 5,782,483 A * | 7/1998 | Rogers et al. | 280/642 |
| 6,220,382 B1 * | 4/2001 | Kramer, Jr. et al. | 180/65.51 |
| 6,530,445 B1 * | 3/2003 | Flowers et al. | 180/208 |
| 7,717,210 B2 * | 5/2010 | Mahy et al. | 180/209 |
| RE43,943 E * | 1/2013 | Andrews | 180/209 |
| 8,602,153 B2 * | 12/2013 | Osswald et al. | 180/306 |
| 2005/0067206 A1 | 3/2005 | Trautman et al. | |
| 2010/0043583 A1 | 2/2010 | Fukano et al. | |

FOREIGN PATENT DOCUMENTS

| | | |
|---|---|---|
| KR | 2002-0047442 | 6/2002 |
| KR | 10-2010-0023763 | 3/2010 |

* cited by examiner

WHEELBASE FOR MOVABLE STRUCTURE

TECHNICAL FIELD

The present invention is related to a wheelbase for a movable structure. More specifically, the present invention is related to a wheelbase of a movable structure which can control its length depending on the situation.

BACKGROUND ART

As a vehicle for a single person, in the commercial field, a wheelchair is a medical appliance which aids the disabled, patients, the elderly and the infirm to move easily. Wheelchairs are classified into the manual wheelchair which is driven by manpower and the electric chair which uses a motor-drive mechanism.

The wheelchair has driving wheels on both sides of the frame constructing the wheelchair, and has front wheels at the front part or rear wheels at the rear part of the frame so as to move easily.

Meanwhile, generally, the space between the front wheels (or the rear wheel) and the driving wheels of the wheelchair is somewhat narrow, so the wheelchair can change its direction or rotate itself in limited space—in other words the wheelchair is designed to be suitable to move indoors. However, as the space between the wheels which is located along the lengthwise direction is narrow, the movement of the wheelchair is unstable when it moves at a high speed. In addition to the wheelchair stated as an example, since the wheelbase of a movable structure like the form of the wheelchair is fixed, it has some problems wherein the movable structure cannot be used suitably in accordance with its situation.

Technical Problem

The suggested improvements of the present invention are not limited by the description above, and other improvements which are not described could be understood by a skilled artisan as follows.

First, the present invention seeks to provide a wheelbase for a movable structure which can easily adjust the space between the front wheels and the driving wheels.

Second, the present invention seeks to provide a wheelbase for a movable structure which can stably move the structure indoors or outdoors.

The suggested improvements of the present invention are not limited by the description above, and other improvements which are not described could be understood by a skilled artisan as follows.

Solution to the Problem

The present invention according to a wheelbase positioned between a front wheel and a rear wheel of a movable structure which connects the front wheel to the rear wheel comprises: a first frame unit which is connected to one of the front wheels or the rear wheels; a second frame unit which connected to another of the front wheel or the rear wheels, positioned below or above the first frame unit, and coupled to the first frame unit (an accommodation space is formed between the first frame unit and the second frame unit); a slider unit which is positioned in the accommodation, and coupled to one of the first frame unit and the second frame unit; a driving unit which is positioned at one end of another of the first frame unit and the second frame unit, and generating a driving force; and a driving-force-transmitting unit which connects the driving unit to the slider unit, and transmits the driving force to the slider unit, and wherein the driving unit moves the slider unit along the lengthwise direction of the other of the first frame unit or the second frame unit and adjusts the space between the front wheels and the rear wheels.

The driving-force-transmitting unit of the present invention is formed into a bar shape, is arranged along another of the first frame unit and the second frame unit, penetrates the slider unit, is tightened with a screw, is rotated by the driving unit and moves the slider unit along the driving-force-transmitting unit.

The driving unit of the present invention comprises a motor-drive unit which generates torque; and a decelerating unit which connects the motor-drive unit with one end of the driving-force-transmitting unit, and transmits the torque of the motor-drive unit to the driving-force-transmitting unit.

The present invention further comprises a bearing unit which is inserted between the slider unit and the driving-force-transmitting unit, and then is fixed, wherein the bearing unit includes a plurality of balls which is arranged along a threaded rod of the driving force transmitting unit.

One of the first frame unit and the second frame unit of the present invention comprises rail grooves which are dented and formed along a lengthwise direction on both sides of one of the first frame unit and the second frame unit; and wherein another of the first frame unit and the second frame unit further comprises rail protrusions which are protruded from the inner surface of another of the first frame unit and the second frame unit, corresponds to the rail grooves and is inserted into the rail grooves.

One of the first frame unit and the second frame unit of the present invention comprises rail protrusions which are protruded and formed along a lengthwise direction on both sides of one of the first frame unit and the second frame unit; and wherein another of the first frame unit and the second frame unit further comprises rail grooves which are dented from the inner surface of another of the first frame unit and the second frame unit, corresponds to the rail grooves and is inserted into the rail grooves.

The present invention further comprises switching units which are positioned at each end of the accommodation space, and place each of the slider unit between thereof; and wherein, if the switching units are contacted with the slider unit, the driving unit is stopped.

At least one of the first frame unit and the second frame unit of the present invention further comprises a pipe-fixing unit which covers one part of a wheel pipe connected to the front wheels or the rear wheels, and fixes the wheel pipe to at least one of the first frame unit and the second frame unit; and a buffer unit which is made of elastic materials, and is positioned between the pipe-fixing unit and the wheel pipe.

One of the first frame unit and the second frame unit of the present invention is extended so as to face the driving unit.

Advantageous Effects of the Invention

The present invention according to the wheelbase for a movable structure including the above constitutions has the following effects.

First, the wheelbase of the movable structure in accordance with the present invention comprises the first frame unit, the second frame unit, the slider unit, the driving unit and the driving-force-transmitting unit. The slider unit is located between the first frame unit and the second frame unit, and it is coupled to one of them. So it is connected to the driving unit by the driving-force-transmitting unit. The driving unit moves along one of the first frame unit and the second frame unit, so the first frame unit against the second frame unit is changed. Consequently, the length of the wheelbase which is configured with the combination of the first frame unit and the second frame unit changes. Thus, the wheelbase for the movable structure in accordance with the present invention can easily adjust the space positioned between the wheels along the lengthwise direction.

Second, as the wheelbase for the movable structure in accordance with the present invention can easily adjust its length, the present invention has the effect that the movable structure can stably move indoors or outdoors by adjusting the length of the wheelbase.

DETAILED DESCRIPTION

Figure 1:
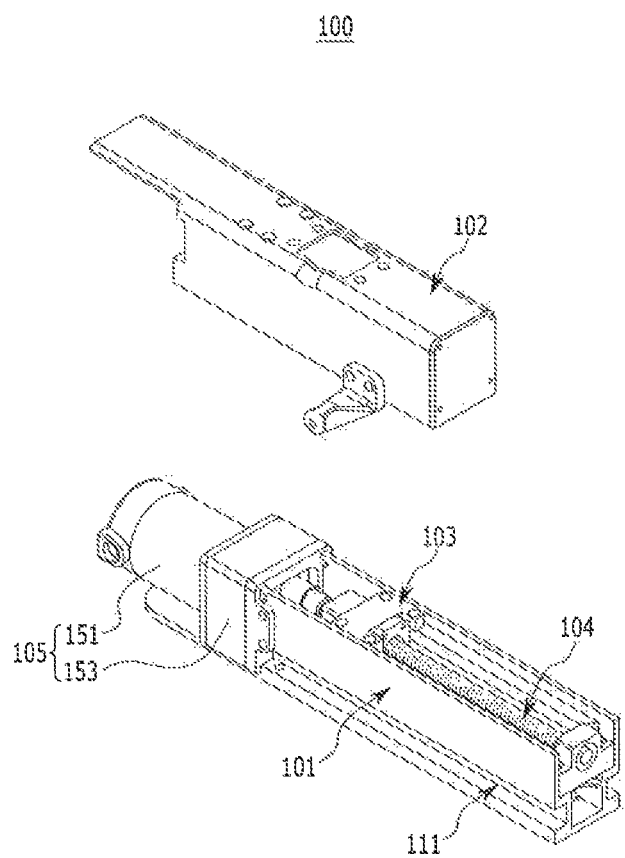
FIG. 1 illustrates an exploded view illustrating the wheelbase of the movable structure in accordance with an embodiment of the present invention.

The present invention according to the wheelbase for a movable structure can have various alterations and examples. The specific examples are shown in the drawings and are detailed in the specification. However, these are not intended to limit the technical spirit of the present invention. Rather, it should be understood that all alterations, all equivalents or all substitutes are included in the present invention.

Figure 2:
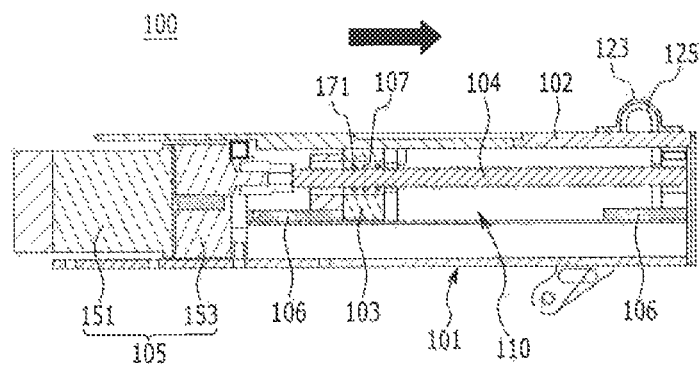
FIG. 2 is a longitudinal section view illustrating the scene wherein the wheelbase shown in FIG. 1 is combined.
Figure 3:
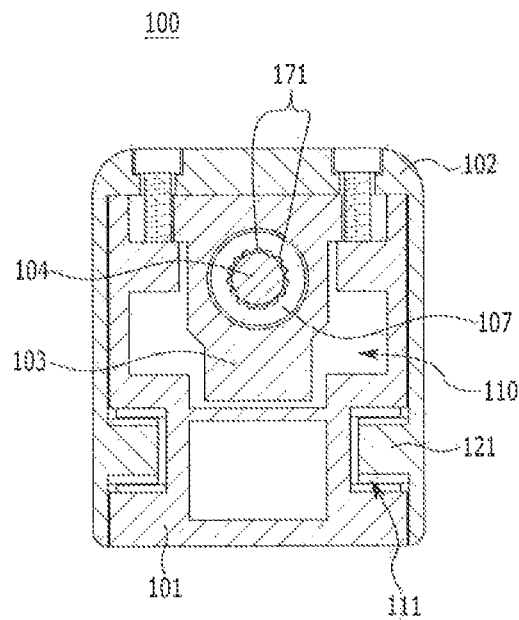
FIG. 3 is a cross-sectional view illustrating the scene wherein the wheelbase shown in FIG. 1 is combined.
Figure 4:
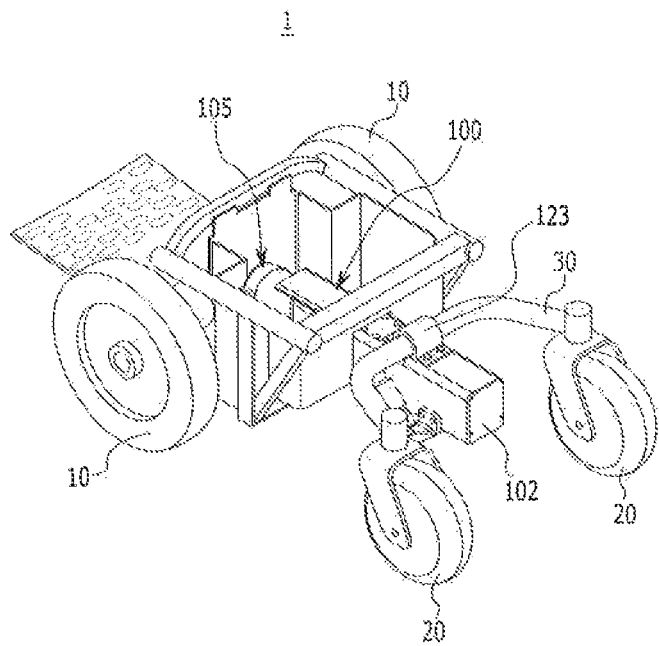
FIG. 4 is a perspective view illustrating the scene wherein the wheelbase shown in FIG. 1 is applied to the movable structure.
Figure 5:
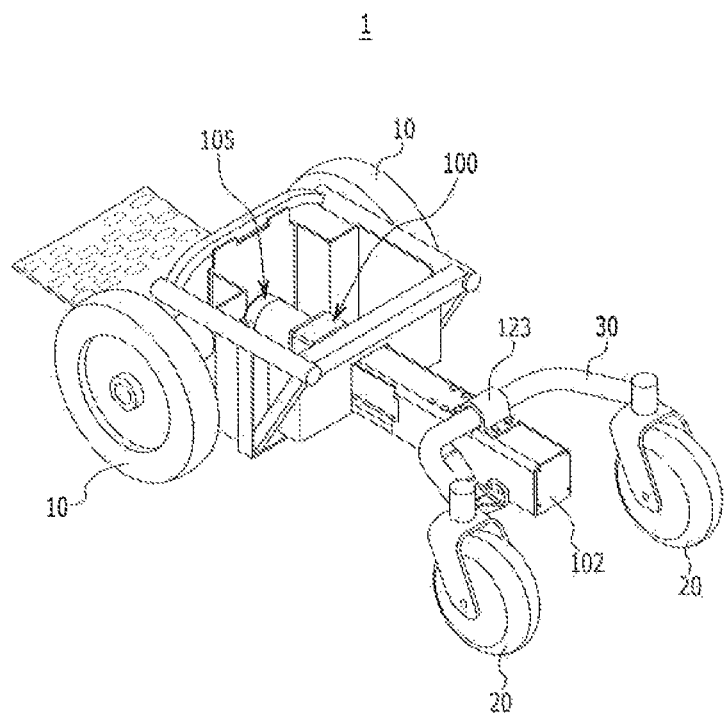
FIG. 5 is a perspective view illustrating the extended wheelbase in the movable structure shown in FIG. 4.

FIG. 1 illustrates an exploded view illustrating the wheelbase of the movable structure in accordance with an embodiment of the present invention. FIG. 2 is a longitudinal-section view illustrating the scene wherein the wheelbase shown in FIG. 1 is combined. FIG. 3 is a cross-sectional view illustrating the scene wherein the wheelbase shown in FIG. 1 is combined. FIG. 4 is a perspective view illustrating the scene wherein the wheelbase shown in FIG. 1 is applied to the movable structure. FIG. 5 is a perspective view illustrating the extended wheelbase in the movable structure shown in FIG. 4.

As illustrated in FIGS. 1 to 5, the wheelbase 100 in accordance with the preferred embodiment of the present invention comprises the first frame unit 101, the second frame unit 102, the slider unit 103, the driving-force-transmitting unit 104 and the driving unit 105. The wheelbase 100 is positioned between the front wheels 10 and the rear wheels 20 of the movable structure 1, and is used to connect them. In the present embodiment, though the movable structure is shown as a wheelchair, the present invention can be applied to different types of movable structures. In addition, in the present embodiment, though the rear wheels 20 are movable against the front wheels 10 which are fixed, the directly opposed idea can be applied.

The first frame unit 101 is connected to the front wheels 10. On both sides of the first frame unit 101, rail grooves 111 are dented and formed along the lengthwise direction of the first frame unit 101.

The first frame unit 101 is positioned under the second frame unit 102, the first frame unit 101 is inserted into the lower surface of the second frame unit 102, and it is coupled to the second frame unit 102. At this time, an accommodation space 110 is formed between the first frame unit 101 and the second frame unit 102. At the inner surface of the second frame unit 102, rail protrusions 121 are protruded and formed along the lengthwise direction of the second frame unit 102. The rail protrusions 121 correspond to the rail grooves 111, and the protrusions 121 are inserted into the rail grooves 111. Consequently, the second frame unit 102 is coupled to the first frame unit 101 and can move along the first frame unit 101. At this time, the rail grooves 111 serve as a guide. The second frame unit 102 is connected to the rear wheels 20.

Meanwhile, as various types can exist, the rail grooves 111 and the rail protrusions are applied to and formed on the first frame unit 101 and the second frame unit 102. For example, the rail protrusions are formed on both sides of the first frame unit 101 and the rail grooves are formed on the inner surface of the second frame unit 102. Similarly, the second frame unit can be applied to the top surface of the first frame unit 101.

The slider unit 103 is coupled to the second frame unit 102 and it is inserted into the accommodation space 110. The slider unit 103 is positioned between the first frame unit 101 and the second frame unit 102. The slider unit 103 moves along the same direction of the second frame unit 102.

The driving-force-transmitting unit 104 is formed into a bar shape. The driving-force-transmitting unit 104 penetrates the slider unit 103, and it is coupled to the slider unit 103. At this time, the driving-force-transmitting unit 104 is arranged along the lengthwise direction of the first frame unit 101, and rotates on the axis in accordance with the direction which the driving-force-transmitting unit 104 is arranged. Consequently, the slider unit 103 can move along the driving-force-transmitting unit 104 on the driving-force-transmitting unit 104. The moving direction of the slider unit 103 is determined by the rotating direction of the driving-force-transmitting unit 104.

The driving unit 105 is positioned at one end of the first frame unit 101, and it is coupled to one end of the driving-force-transmitting unit 104. As the driving unit 105 operates, the driving-force-transmitting unit 104 rotates, and the rotating direction of the driving-force-transmitting unit 104 is determined by the driving unit 105. In addition, the driving unit 105 comprises a motor-drive unit 151 and a decelerating unit 153.

As a commonly used motor, the motor-drive unit 151 generates torque. The decelerating unit 153 connects the motor-drive unit 151 with one end of the drive-force-transmitting unit 104. The decelerating unit 153 receives the torque from the motor-drive unit 151, and transmits the torque to the driving force transmitting unit 104 in accordance with a predetermined moderating ratio. Meanwhile, though the driving unit 105 is not specifically illustrated, the driving unit 105 can be selectively operated by a button, etc.

The first frame unit 101 and the second frame unit 102 are coupled and are overlapped each other. The slider unit 103 is preferably adjacent to the driving unit 105 on the driving-force-transmitting unit 104. Consequently, the driving unit 105 rotates the driving-force-transmitting unit 104 along a predetermined direction so the slider unit 103 recedes from the driving unit 105 on the driving-force-transmitting unit 104. At this time, the interior of the first frame unit 101 can be exposed. Meanwhile, after the interior of the first frame unit 101 is exposed, the driving unit 105 rotates the driving-force-transmitting unit 104 along the reverse direction in order that the slider unit 103 moves to the driving unit 105 on the driving-force-transmitting unit 104. At this time, the first frame unit 101 and the second frame unit 102 are overlapped again. With the operation stated above, the length between the first frame unit 101 and the second frame unit 102 is combined so the entire length of the wheelbase 100 can be adjustable—in other words the distance between the front wheels 10 and the rear wheels 20 is adjusted.

Meanwhile, in the present embodiment, it is disclosed as an example that the driving unit 105 rotates the driving-force-transmitting unit 104 which is screw jointed with the slider unit 103, and the slider unit 103 is moved along a straight line. The present invention is not limited to the above embodiment, so the driving unit 105 can be a sort of a cylinder and it can move the driving-force-transmitting unit 104 along a straight line in order that the slider unit 104 moves along a straight line.

The wheelbase 100 as explained above can be applied to the movable structure 1. Consequently, the wheelbase 100 enables the length of the movable structure 1 to be shortened indoors in order that the movable structure 1 changes its direction of movement; on the other hand, the wheelbase 100 enables the length of the movable structure 1 to be enlarged outdoors in order that the movable structure 1 moves stably.

The second frame unit 102 can be extended to face the driving unit 105 in order that the interior of the first frame unit 101 is not exposed. Consequently, though the entire length of the wheelbase 100 is increased, the interior of the first frame unit 101 and the second frame unit 102 cannot be exposed so the interior is protected from the external environment. Therefore, it can prevent the slider unit 103 and the driving-force-transmitting unit 104 from being damaged by the external environment.

Meanwhile, in the present embodiment, it is disclosed that the first frame unit 101 is positioned below the second frame unit 102 by being inserted into it. In addition, it is disclosed that the slider unit 103 is coupled to the second frame unit 102. However, the first frame unit 101 can be positioned on the second frame unit 102, and the second frame unit 102 can also be inserted on the first frame unit 101. Furthermore, the first frame unit 101 is coupled to the slider unit 103 and then it moves with the slider unit 103.

The wheelbase 100 in accordance with the present invention further comprises switching units 106 and a bearing unit 107.

The switching units 106 are positioned at both ends of the accommodation space 110. The slider unit 103 is positioned between the switching units 106 on the driving-force-transmitting unit 104, and it moves through a space between switching units 106 along the driving-force-transmitting unit 104. At this time, when the slider unit 103 is contacted with the switching units 106, the operation of the driving unit 105 is stopped so the rotation of the driving-force-transmitting unit 104 is stopped. Consequently, the movement of the slider unit 103 is stopped. Therefore, it prevents the slider unit 103 from being moved excessively.

The bearing unit 107 is inserted between the slider unit 103 and the driving-force-transmitting unit 104, and it is fixed at the slider unit 103. In addition, the bearing unit 107 comprises a plurality of balls 171, and the balls are arranged along the threaded rods of the driving-force-transmitting unit 104. At this time, the balls are inserted into the threaded rods of the driving-force-transmitting unit 104 and contacted with each other. Consequently, the bearing unit 107 reduces the frictional force which is generated between the driving-force-transmitting unit 104 and the slider unit 103, so the driving-force-transmitting unit 104 smoothly rotates with reduced frictional force.

In the wheelbase 100, the front wheels 10 and the rear wheels 20 are connected. At this time, the rear wheels 20 are connected with each other by a wheel pipe 30. The wheel pipe 30 is positioned at the top surface of the second frame unit 102, and it is fixed. For the sake of this, the second frame unit 102 further comprises a pipe-fixing-unit 123 and a buffer unit 125.

The pipe-fixing-unit 123 covers one part of the wheel pipe 30, and it fixes the wheel pipe 30 to the top surface of the second frame unit 102. The buffer unit 125 is made of elastic materials, and it is positioned between the pipe-fixing-unit 123 and the wheel pipe 30. When the first frame unit 102 moves, the buffer unit 125 prevents frictional force from being generated between the wheel pipe 30 and the pipe-fixing-unit 123 so it also can prevent noise or abrasion.

Meanwhile, the pipe-fixing-unit 123 and the buffer unit 125 can be applied to not only the second frame unit 102 but also the first frame unit 101. In addition, the rear wheels 20 can be connected to the first frame unit 101, and the front wheels 10 can be connected to the second frame unit 102.

The present invention according to wheelbase for a movable structure can have various alterations and examples. The specific examples are shown in the drawings and are detailed in the specification. However, these are not intended to limit the technical spirit of the present invention. Rather, it should be understood that all alterations, all equivalents or all substitutes are included in the present invention.

The invention claimed is:

1. A wheelbase for connecting front wheels to rear wheels, comprising:
   a first frame unit connected to the front wheels, wherein a top side of the first frame unit is open;
   a second frame unit connected to the rear wheels, wherein the second frame unit is positioned above the first frame unit and slidably coupled to the first frame unit so as to cover the top side of the first frame unit, and wherein a space is formed between the first frame unit and the second frame unit;
   a slider unit positioned in the space and coupled to the second frame unit;
   a driving unit positioned at one end of the first frame unit, wherein the driving unit generates a driving force; and
   a driving-force-transmitting unit connected with the driving unit and the slider unit, wherein the driving-force-transmitting unit transmits the driving force to the slider unit,
   wherein the driving unit moves the slider unit in a lengthwise direction of the first frame unit so as to adjust a distance between the front wheels and the rear wheels,
   wherein the driving-force-transmitting unit includes a threaded rod extending in the lengthwise direction of the first frame unit and passing through the slider unit to engage with the slider unit,
   wherein the driving unit rotates the driving-force-transmitting unit to linearly move the slider unit along the driving-force-transmitting unit,
   wherein a plurality of balls coupled to the slider unit are arranged between the threads of the threaded rod,
   wherein the first frame unit comprises rail grooves formed on both sides of the first frame unit and extending in the lengthwise direction of the first frame unit,
   wherein the second frame unit comprises rail protrusions formed on inner surfaces of the second frame unit, the rail protrusions being inserted into the rail grooves and configured to slide along the rail grooves, and
   wherein a to surface of the second frame unit extends towards the front wheels to ensure covering the top side of the first frame unit during a sliding movement of the second frame unit.

2. The wheelbase according to claim 1, wherein the driving unit comprises a motor-drive unit for generating torque; and
   wherein the wheelbase includes a decelerating unit connecting the motor-drive unit with one end of the driving-force-transmitting unit and transmitting the torque of the motor-drive unit to the driving-force-transmitting unit.

3. The wheelbase according to claim 1, further comprising switching units positioned at both ends of the space, wherein the slider unit moves between the switching units, and wherein when the switching units contact the slider unit, the driving unit stops.

4. The wheelbase according to claim 1, wherein the second frame unit comprises:
   a pipe-fixing unit covering part of a wheel pipe connected to the front wheels or the rear wheels and fixing the wheel pipe to at least one of the first frame unit or the second frame unit; and
   a buffer unit made of elastic materials, wherein the buffer unit is positioned between the pipe-fixing unit and the wheel pipe.

* * * * *